Sept. 15, 1964   L. P. ANDERSON   3,148,454
ALIGNING FIXTURE

Filed June 8, 1961    2 Sheets-Sheet 1

INVENTOR.
LOUIS P. ANDERSON
BY
WILSON, SETTLE & CRAIG
ATTORNEYS

Sept. 15, 1964
L. P. ANDERSON
3,148,454
ALIGNING FIXTURE
Filed June 8, 1961
2 Sheets-Sheet 2
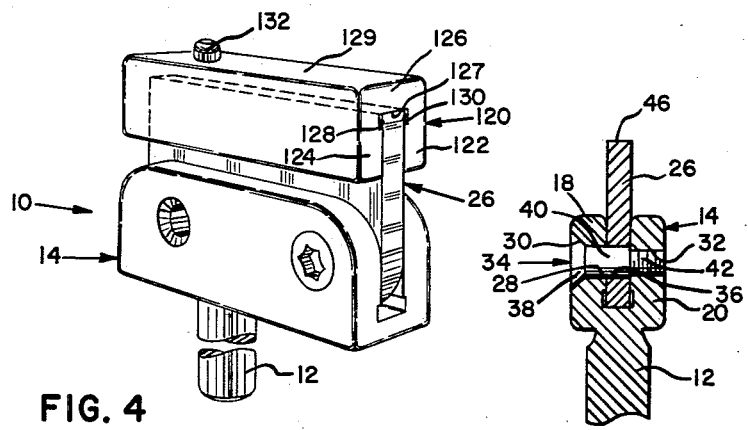
FIG. 4
FIG. 2
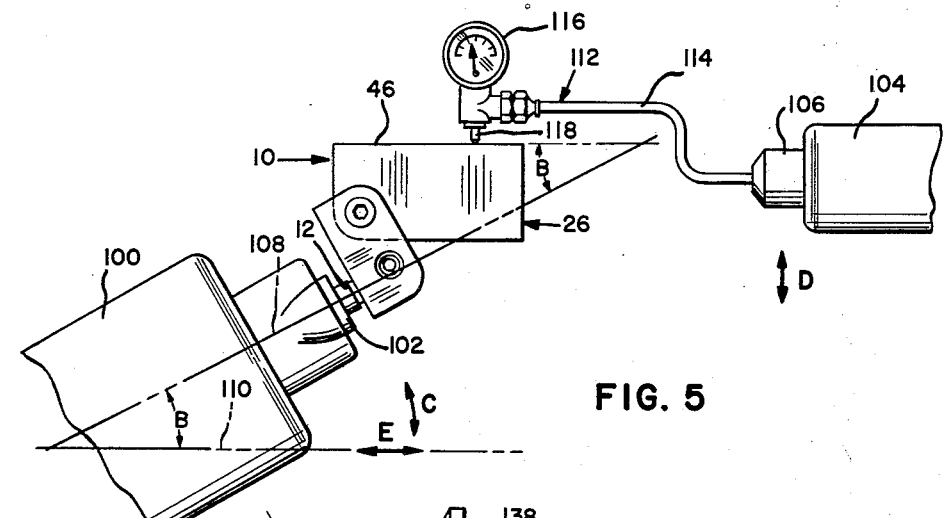
FIG. 5
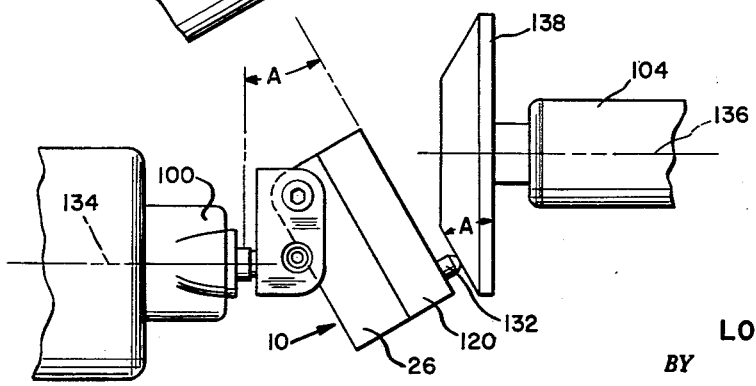
FIG. 6
INVENTOR.
LOUIS P. ANDERSON
BY
WILSON, SETTLE & CRAIG
ATTORNEYS

# United States Patent Office 3,148,454
Patented Sept. 15, 1964

3,148,454
ALIGNING FIXTURE
Louis P. Anderson, 524 Flint Road, Brighton, Mich.
Filed June 8, 1961, Ser. No. 115,730
8 Claims. (Cl. 33—185)

The present invention relates to an aligning fixture, and more particularly to a fixture for setting an angularly adjustable head on a cutting machine such as a grinder, lathe, shaper, planar or milling machine.

Machines such as the above-mentioned have an angularly adjustable head, which may be a work-holding head or a tool-holding head, and which must be set for a machining operation to a particular angle. In the past, the head has been set by laborious and time consuming methods. Various devices have been proposed to facilitate the setting of the head, but most of such devices have limited application and are relatively expensive. The present invention provides an aligning fixture which is universal in nature in that it may be used on a large variety of machines and which is inexpensive and simple to use.

It is an object of the invention to provide an aligning fixture which may be utilized on a large variety of cutting machines to rapidly set the angularly adjustable head of the machine to any desired angle.

Another object of the invention is to provide such a fixture which is simple in construction and relatively inexpensive to manufacture.

A further object of the invention is to provide an aligning fixture which is readily adjustable to a desired angle and which may be locked in any desired angular position.

A still further object of the invention is to provide such a fixture which may be installed on the adjustable collet provided on most cutting machines.

Another object of the invention is to provide, in one embodiment, an accessory cutting tool which coacts with the aligning fixture to facilitate dressing of grinding wheels.

Other objects of this invention will appear in the following description and appended claims, reference being had to the accompanying drawings forming a part of this specification wherein like reference characters designate corresponding parts in the several views.

In the drawings:

FIGURE 2 is a sectional view taken substantially along the line 2—2 of FIGURE 1 looking in the direction of the arrows;

FIGURE 4 is a view of the aligning fixture of FIGURE 1 showing an accessory cutting tool mounted thereon;

FIGURE 5 is a top plan view of a cutting machine showing the use of the aligning tool of FIGURE 1 in setting the work-head of the machine at the desired angle; and FIGURE 6 is a top plan view of the aligning fixture and cutting tool arrangement shown in FIGURE 4 installed on the work-head of a machine and positioned to dress a grinding wheel.

Figure 1:
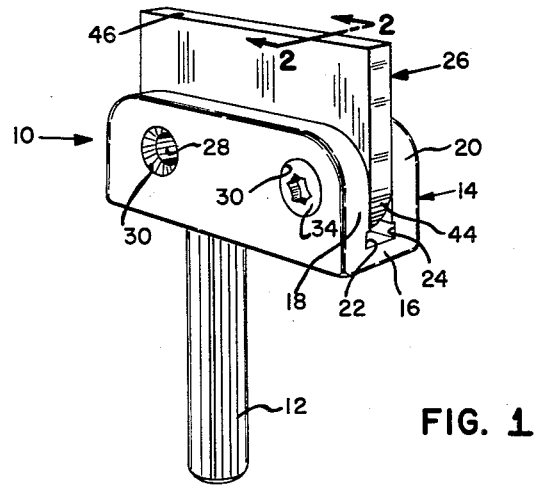
FIGURE 1 is a perspective view of one embodiment of the aligning fixture of the present invention.

Other objects of this invention will appear in the following description and appended claims, reference being had to the accompanying drawings forming a part of this specification wherein like reference characters designate corresponding parts in the several views.

Referring to FIGURES 1 and 2, it may be seen that the aligning fixture 10 comprises a cylindrical spindle 12 which extends at substantially right angle from a holder 14. The holder 14 comprises a bottom wall 16 having a pair of parallel upstanding spaced apart side walls 18, 20. A longitudinally extending groove 22, 24 is provided at the juncture of the side walls 18, 20 with the bottom wall 16. These grooves tend to prevent jamming of a plate 26 which is pivotally mounted between the holder side walls. The plate 26 has a flat upper surface 46 which is utilized in setting the fixture at the desired angle.

A pair of openings 28 are provided in the side wall 18 of the holder. Each of the openings is countersunk at 30. A pair of internally threaded openings 32 are provided in the opposite side walls 20 each being in registry with an opening 28. A screw 34 is inserted through one of the openings 28 and passes through an opening 36 in the plate 26 into threading engagement with the registering threaded opening 32 to pivotally secure the plate to the holder. The screw 34 has an enlarged head 38 which is received in the countersunk portion 30. An unthreaded shank portion 40 extends from the head 38 and external threads 42 are provided on the outer end of the screw. The purpose of the second set of openings 28, 32 is to permit positioning of the plate at various locations with respect to the holder to provide for a wider range of use for the fixture.

As will be noted, the corner of the plate adjacent the screw 34 is rounded at 44 to permit pivoting of the plate. The plate is substantially as thick as the space between the side walls 18, 20 whereby there is some frictional contact between the plate and the surfaces of the walls. Additionally, the diameter of the screw shank 40 is approximately equal to the diameter of the openings through which it extends to form a slip fit therewith. This arrangement provides for intimate contact between the moving parts to the end that when the plate 26 is pivoted to an adjusted position, the screw 34 may be tightened to press the side walls 18, 20 against the plate to lock the plate in the adjusted position without disturbing the accuracy of the setting. The contact between the parts assures that the plate will not shift after being locked and will not shift during the process of tightening the screw.

The angular relationship relied upon in setting the fixture at a predetermined angle is the angle which the flat surface 46 of the plate makes with a plane perpendicular to the longitudinal axis of the spindle 12. The pivot axis of the plate 26, defined by the longitudinal axis of the screw 34, is parallel to these two planes in order to provide a constant point of reference to measure this angle.

Figure 3:
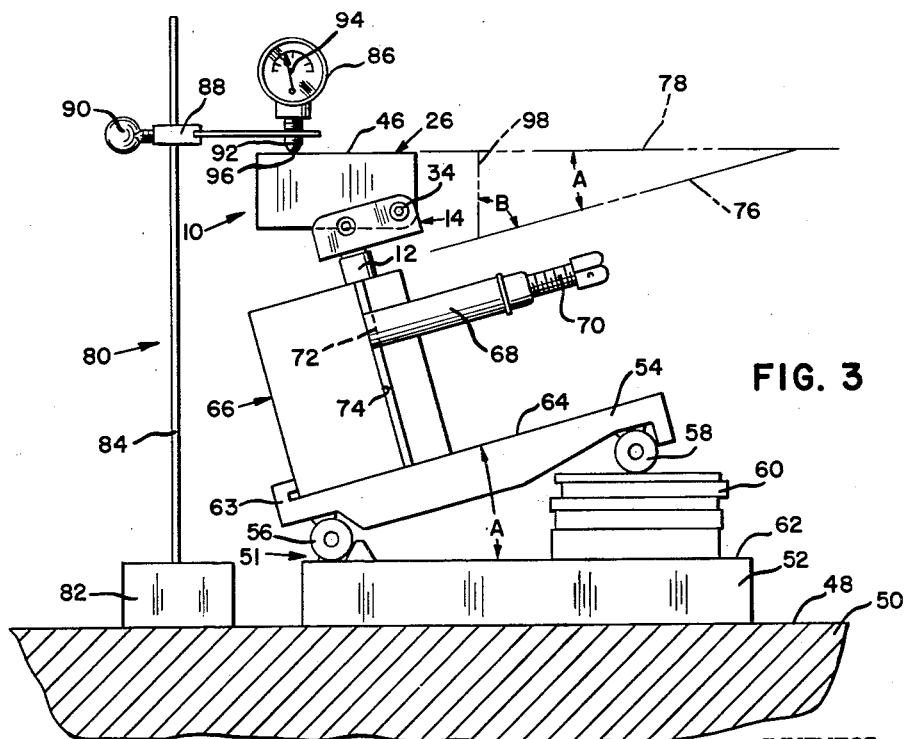
FIGURE 3 is a side elevational view showing a typical arrangement for setting the aligning fixture of FIGURE 1 at the desired angle using standard tool room accessories such as surface plate, sine plate, V block, test indicator, surface gage, and size blocks.

A typical arrangement for setting the fixture 10 at the desired angle is illustrated in FIGURE 3. As above mentioned, the angle of interest in setting the fixture is the angle which the plane of the plate surface 46 makes with a plane perpendicular to the longitudinal axis of the spindle 12. In FIGURE 3, this angle is designated "A." In the arrangement shown, the setup is made on a flat surface 48 of a support structure 50. A sine bar 51 having a base 52 rests on the surface 48. A sine plate 54 is pivotally mounted to the base 52 by hinge structure 56. A cylindrical structure 58 is provided at the free end of the sine plate to make line contact with the upper surface of a plurality of stacked size blocks 60. The size blocks 60 are provided in varying thicknesses and are utilized to raise the cylindrical structure 58 a desired distance from the surface 62 of the base 52. By simple right-angle triangulation, the sine plate 54 is raised to a point where the angle between the surface 64 and surface 62 equals the desired angle A.

The fixture 10 is mounted in a V-block 66 by means of a clamp 68 having a bolt 70 to lock the spindle 12 into the V. The clamp 68 has feet 72 which engage slots 74 in the side of the V-block. The V-block is set on the sine plate 54 and held in place by a projection 63. This arrangement orients the longitudinal axis of the spindle 12 at right angles to the surface 64 of the sine plate. A plane perpendicular to the longitudinal axis of the spindle as illustrated by the dotted line 76, will consequently be parallel to the surface 64. If the plate 26 is then pivoted to a position where the surface 46 is parallel to the surface 62 of the sine bar base, as illustrated by the dotted line 78, then the angle formed by the planes represented by lines 76, 78 will be equal to the angle A. The plate 26 is positioned at this desired angle by use of a gage structure 80 which comprises a base member 82 which rests on the support surface 48. The base 82 has an upstanding rod 84 which terminates above the plate 26. A gage 86 is slidably mounted on the rod 84 by a bracket 88 having a thumb screw 90 to position the gage in different vertically adjusted positions. The gage 86 has a depressible feeler finger 92 which is operably connected through mechanism (not shown) to a dial pointer 94 to indicate axial movement of the finger 92.

In operation, the plate 26 is set to a position where the surface 46 is approximately parallel to the surface 48. The gage structure 80 is then shifted along the surface 48, with the tip 96 of the finger 92 touching the surface 46. If the dial pointer 94 moves during such shifting, then the surface 48 is not parallel to the surface 50. The plate 26 is adjusted until there is no pointer movement upon shifting of the gage structure. At this point, the desired angular relationship has been achieved and the screw 34 is tightened to lock the fixture 10 in its adjusted position.

In addition to setting the fixture for the angle A, a second angle B is also inherently set. By simple right-angle triangulation, a plane indicated by the dotted line 98 which is perpendicular to the plane indicated by line 78 defines an angle B which is equal to 90° minus the angle A. Angle B may also be used in setting the head of a cutting machine.

A typical illustration of the use of the fixture 10 in setting an angularly adjustable work-head of a grinding machine is illustrated in FIGURE 5. In this example, the angle B is used to set the head 100. The head 100 has a collet 102 to hold stock to be machined. The head is capable of pivotal motion defined by the arrow C and straight line motion defined by the arrow E. The grinding spindle 104 is capable of movement indicated by the arrow D. The spindle 104 has a chuck 106 to normally hold a grinding wheel.

In setting up the grinding machine, the spindle 12 is inserted into the work-head collet 102 which is then tightened to lock the fixture in place. In the instance shown in FIGURE 5, it is desired to set the longitudinal axis, indicated by the dotted line 108, of the work-head at the angle B with respect to a vertical plane defined by the dotted line 110. The head 100 is pivoted to a position where the surface 46 is approximately parallel to the plane 110. A gage structure 112 is mounted by means of rod 114 in the chuck of the spindle 104. The gage structure 112 includes a gage 116 which is similar to the previously described gage 86, having a depressible finger 118 which contacts the surface 46. The head 100 is moved along the path indicated by the arrow E and the head 100 is adjusted angularly until no change in reading is indicated on the gage 116. At this point, the work-head 100 is set at the desired angle B. The head 100 is then locked in place, the fixture and gage structures removed, whereupon a grinding wheel is mounted on the spindle 104 and work stock is mounted on the head 100 and the machining operation is performed.

In addition to setting the head of a machine, the fixture 10 may also be utilized to dress a grinding wheel as illustrated in FIGURES 4 and 6. A cutting tool comprising a holder 120 is provided for sliding engagement with the plate 26. The holder 120 includes spaced apart side walls 122, 124 which are joined together by a web 126 having a flat inner face 127. Longitudinally extending grooves 128, 130 are provided at the juncture of the walls 122, 124 with the web 126 to prevent jamming. A cutting tool 132, which may be a diamond tool, is mounted in the outer surface 129 of the wall 126.

The holder 120 is received on the plate 26 with surface 46 of the plate in sliding contact with surface 127 whereby sliding of the holder 120 along the plate 26 will move the cutting tool 132 in a path defined by the adjusted angle of the plate. In operation, the fixture 10 is mounted in the work-head 100 as previously described. The fixture has, of course, been previously set to the desired angle A as described in connection with FIGURE 3. The head 100 is then set so that its longitudinal axis, defined by dotted line 134, is parallel to the longitudinal axis of the spindle 104, defined by the dotted line 136. Setting of the head 100 is done by conventional means, although if desired, the fixture 10 may be used for this purpose and then reset to the angle A for the dressing operation. The grinding wheel 138 is then mounted in the spindle 104 and the head 100 is moved forward until the cutting tool 132 makes contact with the grinding wheel. The holder 120 is then moved back and forth on the plate 26 to take an angular cut on the wheel 138. The head 100 is advanced after each cut until the desired amount of material has been removed from the wheel. As will be appreciated, the angle which is cut on the periphery of the wheel will be equal to the angle A.

Having thus described my invention, I claim:

1. An aligning fixture comprising a spindle securable to an angularly adjustable head of a cutting machine; a holder on the spindle including a bottom wall carried on one end of the spindle; a pair of substantially parallel spaced apart side walls extending outwardly from one surface of the bottom wall; a plate received between the side walls and pivotally secured thereto; said plate having a flat surface; the pivot axis of said plate being parallel with a plane perpendicular to the longitudinal axis of said spindle and parallel with said flat surface; and means to press the side walls of the holder together to lock said plate in a position with its flat surface in a selected angularly adjusted position with respect to a plane perpendicular to the longitudinal axis of the spindle.

2. An aligning fixture comprising a spindle securable to an angularly adjustable head of a cutting machine; a holder on the spindle including a bottom wall carried on one end of the spindle; a pair of substantially parallel spaced apart side walls extending outwardly from one surface of the bottom wall; a plate received between the side walls; said side walls and plate each having an opening; said openings being in registry with one another; a pivot pin comprising a shank having an enlarged head at one end and a threaded portion at the opposite end; said pin being inserted through said openings to pivotally secure the plate to the holder; said plate having a flat surface; the pivot axis of said plate being parallel with a plane perpendicular to the longitudinal axis of said spindle and parallel with said flat surface; and a nut structure threadingly engaged with the pivot pin and operable upon being threaded onto the pin to press the side walls of the holder together to lock said plate in a position with its flat surface in a selected angularly adjusted position with respect to a plane perpendicular to the longitudinal axis of the spindle.

3. A device as claimed in claim 2 and further characterized in that one of said side wall openings is internally threaded forming the nut structure for threading engagement with the threaded portion of the pivot pin.

4. A device as claimed in claim 2 and further characterized in the provision of a plurality of sets of registering openings in the holder side walls whereby the plate may be positioned at different locations on the holder.

5. A device as claimed in claim 2 and further characterized in that the diameter of the unthreaded shank portion of the pivot pin is substantially equal to the diameter of the openings in the holder side walls and plate thereby forming a slip fit with said elements.

6. A device as claimed in claim 2 and further characterized in that the spindle is cylindrical.

7. A device as claimed in claim 2 and further characterized in that the plate is of sufficient thickness to simultaneously contact the inner surfaces of the holder side walls forming a slip fit therewith.

8. A fixture comprising a spindle securable to the workhead of a grinding machine; a holder on the spindle; an angularly adjustable member pivotally mounted on the holder; said angularly adjustable member having a flat surface; means to lock the angularly adjustable member in a selected position with respect to a plane perpendicular to the longitudinal axis of the spindle; a cutting tool slidably mountable on the angularly adjustable member; said cutting tool comprising a pair of substantially parallel spaced apart side walls joined together by a web having a substantially flat inner surface; said web having a cutting element secured to its exterior surface; said cutting tool being received on said angularly adjustable member with said side walls of the cutting tool extending around the angularly adjustable member and the flat inner surface of the web in sliding contact with the flat surface of the angularly adjustable member whereby the cutting tool may be moved along said angularly adjustable member in a path defined by the adjusted position of the angularly adjusted member.

References Cited in the file of this patent

UNITED STATES PATENTS

| | | |
|---|---|---|
| 2,293,108 | Brebeck | Aug. 18, 1942 |
| 2,378,743 | Wisne | June 19, 1945 |
| 2,733,702 | Barrett | Feb. 7, 1956 |

FOREIGN PATENTS

| | | |
|---|---|---|
| 243,375 | Switzerland | Jan. 3, 1947 |